Feb. 6, 1968   HUGH L. DRYDEN, DEPUTY   3,367,445
ADMINISTRATOR OF THE NATIONAL AERONAUTICS
AND SPACE ADMINISTRATION
FLUID LUBRICANT SYSTEM
Filed Oct. 22, 1965
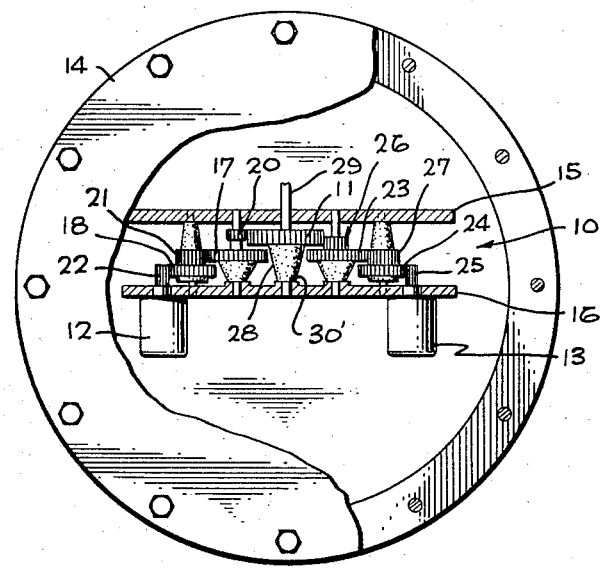
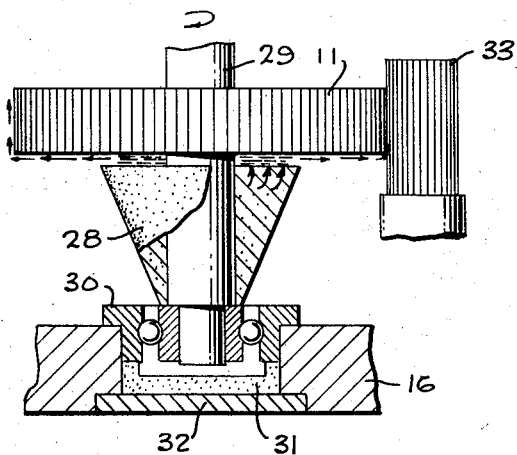
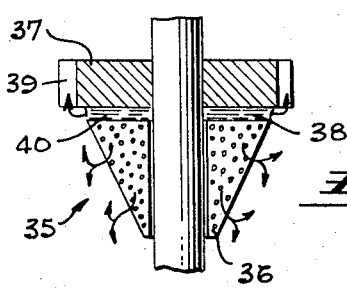
JOSEPH C. HEINDL
ROBERT J. BELANGER
INVENTORS
BY
Howard B. Scheckman
ATTORNEYS

United States Patent Office 3,367,445
Patented Feb. 6, 1968

3,367,445
FLUID LUBRICANT SYSTEM
Hugh L. Dryden, Deputy Administrator of the National Aeronautics and Space Administration, with respect to an invention of Joseph C. Heindl, Palos Verdes Peninsula, and Robert J. Belanger, Los Angeles, Calif.
Filed Oct. 22, 1965, Ser. No. 502,710
13 Claims. (Cl. 184—1)

ABSTRACT OF THE DISCLOSURE

Apparatus for providing lubrication for moving mechanism such as gears or bearings, which are required to operate under very adverse conditions, is afforded by placing a porous material constituting an oil reservoir in such proximity with the face of a bearing or gear that capillary attraction fills the space therebetween. Thereafter, centrifugal forces distribute the oil from the space between the reservoir and the bearing or gear to the surfaces requiring lubrication.

Origin of invention

The invention described herein wae made in the performance of work under a NASA contract and is subject to the provisions of Section 305 of the National Aeronautics and Space Act of 1958, Public Law 85–568 (72 Stat. 435; 42 USC 2457).

Background of the invention

The present invention relates to lubrication means for moving mechanisms and more particularly to a novel method and apparatus for providing positive and effective lubrication of gear teeth, bearings or the like employed in such mechanisms.

There has been a problem of obtaining long life and reliability for interconnecting moving mechanisms operating in the vacuum of space. As space exploration continues to grow, more demands are made upon space equipment in the terms of performance and complexity. Although new areas of technology are being developed, many of the old familiar ones, such as lubricated mechanisms, containing bearings and gears, which have been developed to a high degree for operation within the earth's atmosphere, must now be further developed in order to cope with the environment of the vacuum in space.

Conventional bearing and gear train mechanisms operating at orbital altitudes are likely to experience rapid failure due to the extreme vacuum. Depending on the parameters of the orbit, the vacuum pressure may range from $10^{-6}$ to $10^{-12}$ mm. Hg; this condition will cause solid materials to sublimate and liquid to evaporate. Oils and greases used to lubricate bearings and gears, if exposed to the vacuum, will disappear in time and cause early failure of the contacting, moving surfaces.

Failure can also occur due to cold welding of the contacting or engaging parts. Within the earth's atmosphere, pure metal-to-metal contact between surfaces is prevented due to the formation of oxide films and gas layers deposited on the metal surfaces and their interaction with the lubricant. These oxide films and gas layers are produced by the atmosphere reacting with the metal. However, in the vacuum of space, the gas layers are diffused and the oxide films cannot be re-formed once they have been broken down by the initial sliding action occurring between two surfaces and the lubrication mechanism is destroyed. Hence, subsequent contact will be between two clean metal surfaces resulting in cold welding or seizure.

One way of circumventing these difficulties is to contain as many elements of a moving mechanism as possible inside a sealed pressurized case. However, it is still necessary to provide a method of maintaining adequate lubrication of bearings and gears for that portion of the drive mechanism contained in the sealed case so that an operating life of many thousands of hours can be achieved without failure.

Accordingly, the method and apparatus of the present invention provides a novel means for replenishing fluid lubricant to moving mechanisms such as gears and bearings which provides a reservoir located adjacent to the mechanism to be lubricated so that a small gap exists therebetween. The reservoir is formed of a porous metal material which is saturated with a fluid lubricant and is placed adjacent to the face of the gear or bearing mechanism to be lubricated. The small gap provided between the contacting surfaces of the mechanism to be lubricated and the reservoir is filled with the lubricant and maintained therein by capillary action. As the mechanism rotates, centrifugal force will cause the lubricant on the face of the gear to migrate or flow, radially toward the teeth. Once the lubricant contacts the mating mechanism, it will be distributed across the tooth or bearing surface thereof. Tests have shown that the oil supply present in the reservoir is adequate to last for several thousand hours of operation.

A feature of the present invention also resides in the fact that by causing relative motion between the mechanism to be lubricated and the reservoir containing the lubricant, a simple fluid pump is achieved so that the lubricant, such as oil, will flow out of the pores of the reservoir and onto the outside surface of the reservoir where the oil will flow by centrifugal force into steady and continuous contact with the mechanism surfaces.

Therefore, it is a primary object of the present invention to provide a novel lubricator unit employing a simplified one-piece porous metal reservoir which is of exceptionally simple and inexpensive construction and which meets lubricating requirements for moving mechanisms operating in a vacuum.

Another object of the present invention is to provide a novel method and apparatus for replenishing fluid lubricant to operating mechanisms which employs the advantageous features of capillary action and centrifugal force.

Still a further object of the present invention is to provide a novel method and apparatus for replenishing fluid lubricants to operating mechanisms which includes a porous metal reservoir that serves to maintain the working surface of operating mechanisms with a constant supply of lubricating fluid.

It is still a further object of the present invention to provide a novel replenishing means for providing a fluid lubricant to operating mechanisms which may readily serve as a simple fluid pump.

The features of the present invention which are believed to be novel are set forth with particularity in the appended claims. The present invention, both as to its organization and manner of operation, together with further objects and advantages, can best be understood by reference to the following description, taken in connection with the accompanying drawings, in which:

FIGURE 1 is an elevational view of a pressurized case having a portion broken away to expose a typical moving mechanism including a lubricator means therefor embodying one embodiment of the present invention;

FIGURE 2 is an enlarged sectional view, partly in elevation, of a gear train and bearing mechanism employed in the system of FIGURE 1 illustrated in conjunction with an oil reservoir therefore; and FIGURE 3 is a sectional view, partly in elevation, showing an embodiment of the present invention wherein the novel reservoir as illustrated in FIGURES 1 and 2 operates as a simple fluid pump.

Referring to FIGURE 1, a general gear train system configuration operating five fine pitched gear train sub-systems is shown in the general direction of arrow 10 which are of the type used in conventional precision servo-mechanisms. The gear train is symmetrically located about a large central gear 11 and is driven and loaded by a pair of servo motors 12 and 13 located at the ends of the gear train. Loading of the gear train is accomplished by operation of motors in opposing directions with one motor operating at a reduced voltage. The gear train system 10 is made up of several gear train sub-systems for test purposes differing in size and material so as to demonstrate that the fluid lubricant replenishing method and apparatus of the present invention will readily operate just as successfully with small systems as compared to a large overall system. All the sub-systems are shown as operating in a sealed case 14 containing argon gas since the case is intended to be an all hermetically sealed package. By operating the gear train system in an inert atmosphere, such as argon, oxidation of the lubricating oils is delayed and thus, the life of the system is extended.

The gear train system and sub-systems are mounted between supporting plates 15 and 16 wherein gears 17 and 18 are in driving relationship with the central gear 11 via pinions 20 and 21 by means of the servo motor 12 via drive pinion 22. On the opposite side of the central gear, there is rotatably located gears 23 and 24 operable from the servo motor 13 via its drive pinion 25 which are interconnected with the central gear via pinions 26 and 27. It is to be noted that each of the gears is associated in close proximity to a gear lubricant reservoir such as is indicated by numeral 28. Each reservoir is mounted in common on a rotatable shaft, such as shaft 29, with a gear and is included so that an adequate supply of fluid lubricant may be provided to the intermeshing gear teeth. It is also to be noted that the central gear 11, for example, is seated in a bearing 30 and that the bearing is lubricated with oil supplied from the reservoir 31 as shown in FIGURE 2.

The lubricating action between the gear and bearing reservoirs depends on using a porous metal material, and for this purpose sintered bronze may be effectively employed because of its ability to hold large amounts of oil within internal interconnecting chambers and passages. The porous material making up each of the reservoirs is saturated with oil and is placed adjacent to the face of the gear in fixed spaced relationship thereto. Inasmuch as each gear reservoir is substantially conical in shape, the base of the reservoir is placed adjacent the gear surface to be lubricated. The positioning of each reservoir with respect to each gear is such that a small gap, such as is indicated by numeral 38 in FIGURE 3, exists between the opposing surfaces so that the gap will be filled with oil and maintained therein by capillary action. As the gear and reservoir rotate simultaneously in the same direction, centrifugal force will cause the oil in the face of the gear as supplied by the reservoir to migrate, or flow, radially towards the teeth provided about the periphery of the gear. Once the oil contacts the mating pinion 33, it is distributed across the tooth surface thereof.

Bearing 30 as shown in FIGURE 2 is representative of a standard flange type instrument bearing which is used to support the gear shaft 29 of the gear train system. To lubricate the bearing, an oil saturated porous metal material 31 is used as a reservoir pad and is placed adjacent to the bearing. The bearing bore and an end cap 32 permits the oil to flow into the bearing only. As the bearing oil is consumed, it is replenished by oil drawn from the reservoir pad 31.

In operation, the reservoir 28 is fixed to the drive shaft for each gear by suitable means (not shown) so that the reservoir will rotate with the shaft. The reservoir is composed of sintered bronze material which is porous and contains a supply of lubrication fluid. The reservoir is closely located to the gear allowing no more than .020 inch of a gap to exist between. As the gear and reservoir rotate, the gap or space therebetween will be filled with oil via capillary action, and due to the centrifugal force generated by rotation thereof, the oil in the gap will migrate to the periphery of the gear where it will be distributed across the surface of the gear teeth. The oil supply in the gap between the reservoir and gear will be maintained by capillary action until the oil supply within the reservoir has been exhausted. Tests have shown that the oil supply present in the reservoir is adequate to maintain proper lubrication for several thousand hours of operation.

Referring now to FIGURE 3, a simple fluid pump is shown in the general direction of arrow 35 incorporating the features of the present invention so that when an oil filled reservoir 36 is rotated with respect to a gear 37, or when the gear is rotated relative to the reservoir, a positive pumping action is generated which will force oil out through the pores of the reservoir over the entire external surface of the reservoir. The slightest rotary motion between the reservoir and the gear will cause oil to flow from a gap 38 onto the teeth 39 of the gear providing that the gear dedendum is close to the oil meniscus 40 existing between the gear face and the reservoir. It is noted by arrows that oil lubricant will flow out of the pores and onto the outside surface of the reservoir and thence to the gear teeth. Therefore, it can be concluded that a positive oil flow can be directed to the gear.

What is claimed is:

1. Lubricating means for a gear drive system consisting of a rotatable gear and a rotatable pinion in driving engagement therewith comprising:
    a reservoir of porous material saturated with a flowable fluid lubricant; and
    means for rotatably mounting said reservoir in close spaced relation to the rotatable gear whereby rotation of the gear and said reservoir causes said lubricant to fill the area between said reservoir and the gear and to distribute said lubricant outwardly on the gear to the pinion.

2. Lubricating means for a gear drive system consisting of a rotatable gear and a rotatable pinion in driving engagement therewith comprising:
    a reservoir of porous metal material saturated with a flowable fluid lubricant; and
    said reservoir coaxially disposed with respect to the rotatable gear and secured thereto in fixed spaced relationship thereto whereby simultaneous rotation of the gear and said reservoir in the same rotary direction causes said lubricant to fill the area between said reservoir and the gear by capillary action and to distribute said lubricant outwardly on the gear to the pinion via centrifugal force.

3. Lubricating means for a drive gear system comprising:
    a rotatable gear;
    a rotatable pinion in driving engagement with said gear;
    a reservoir of porous material saturated with a fluid lubricant rotatably carried with said gear and having a face thereon arranged in fixed spaced relationship with respect to said gear so as to form a gap therebetween;
    said reservoir adapted to fill said gap with said lubricant through capillary action as said reservoir and said gear rotate whereby the lubricant migrates under centrifugal force radically towards and into contact with said pinion; and
    means for rotating said gear and said reservoir.

4. The invention as defined in claim 3 including a sealed case inclosing said gear, said pinion and said reservoir; and means filling said sealed case with a substantially inert gas.

5. The invention as defined in claim 3 wherein said reservoir comprises:

a porous metal unit having a substantially conical form; and
wherein said reservoir face is formed on the base end of said conical form.

6. Lubricating means for a drive gear system comprising:
a rotatable gear having a plurality of teeth arranged about the periphery thereof;
a rotatable pinion in driving arrangement with said gear teeth;
a conically shaped reservoir of porous metal material co-axial with and rotatably carried on said gear and having a face formed on the base end thereof arranged in fixed spaced relationship with respect to said gear so as to form a gap therebetween; and
said reservoir being impregnated with a fluid lubricant and adaptable to fill said gap with said lubricant as said reservoir and said gear rotate simultaneously in the same direction whereby the lubricant migrates under centrifugal force radically towards and into contact with said pinion.

7. The invention as defined in claim 6 wherein said reservoir of porous metal material includes a plurality of internal interconnecting chambers for holding a quantity of said fluid lubricant; and
a multiplicity of lubricant passages interconnecting said internal chambers exteriorly of said reservoir so that a continuous supply of fluid lubricant is present about the periphery of said reservoir.

8. The invention as defined in claim 7 wherein said reservoir is composed of sintered bronze material and wherein said reservoir is located not more than .020 inch from said gear.

9. Lubricating means for a moving mechanism comprising:
a moving mechanism;
a reservoir of porous metal material saturated with a fluid lubricant movably carried with said mechanism and having a face thereon arranged in fixed spaced relationship with respect to said mechanism so as to form a gap therebetween which is dimensioned to be filled with lubricant from said reservoir by capillary forces; and
said reservoir adapted to fill said gap with said lubricant through capillary action as said reservoir and said mechanism rotate whereby the lubricant migrates under centrifugal force radially outward towards the extremities of said mechanism.

10. Lubricating means for a moving mechanism system comprising:
a moving mechanism;
a conically shaped reservoir of porous metal material movably carried on said mechanisms and having a face formed on the base end thereof arranged in fixed spaced relationship with respect to said mechanism so as to form a gap therebetween; and
said reservoir having a plurality of interconnecting internal chambers being impregnated with a fluid lubricant and passage means formed therein for feeding said lubricant from said chambers to the exterior surface of said reservoir, said gap being dimensioned to be filled with said lubricant by capillary attractions; and means for rotating said reservoir and said moving mechanism simultaneously in the same direction whereby the lubricant migrates under centrifugal force radially towards and into contact with said moving mechanism.

11. A fluid pump comprising:
a rotatable shaft;
a member secured to said shaft;
a reservoir of porous metal material having a plurality of internal interconnecting chambers saturated with a fluid lubricant;
means for mounting said reservoir about said shaft in fixed spaced relationship to said member so as to provide a gap therebetween dimensioned to enable capillary action to fill said gap with fluid from said reservoir; and
means for rotating said member via said shaft with respect to said reservoir to cause said member to rotate relative to said reservoir whereby said fluid lubricant flows into said gap and outwardly under pressure on the surface of said member.

12. The method of lubricating a moving mechanism comprising the steps of:
storaging a supply of flowable lubricant within interconnecting pores of a reservoir of porous material;
flowing said stored lubricant about the external surface of the reservoir by rotating the mechanism and reservoir in the same direction;
maintaining the flowed lubricant between the mechanism and the reservoir; and
employing centrifugal force to forcibly urge the maintained lubricant outwardly over the surface of the mechanism.

13. The method of lubricating a moving mechanism comprising the steps of:
locating a porous reservoir containing a quantity of fluid lubricant in close proximity to the mechanism so as to provide a slight gap therebetween;
providing a substantially inert gas about the reservoir and the mechanism;
rotating the mechanism and the reservoir in the same direction in the vacuum to provide a supply of lubricant about the exterior surface of the reservoir;
maintaining a supply of lubricant in the gap provided between the mechanism and the reservoir by capillary action; and
forcibly urging the maintained lubricant outwardly over the surface of the mechanism by centrifugal force created by the rotary movement of the mechanism.

References Cited

UNITED STATES PATENTS

| 1,930,312 | 10/1933 | Greenhoe | 308—187 |
| 2,130,325 | 9/1938 | Pardee | 308—187 X |
| 2,708,985 | 5/1955 | Evans et al. | |

LAVERNE D. GEIGER, *Primary Examiner.*

E. J. EARLS, *Assistant Examiner.*